(12) United States Patent
Kather

(10) Patent No.: US 8,305,073 B2
(45) Date of Patent: Nov. 6, 2012

(54) POSITION SENSOR, POSITION SENSOR ARRANGEMENT AND METHOD OF OPERATING THE SAME BY MEASURING THE ANGULAR ORIENTATION OF A LOCAL MAGNETIC FIELD VECTOR

(75) Inventor: Lutz Kather, Zülpich (DE)

(73) Assignee: Getrag Ford Transmissions GmbH, Cologne, DE (US)

( * ) Notice: Subject to any disclaimer, the term of this patent is extended or adjusted under 35 U.S.C. 154(b) by 836 days.

(21) Appl. No.: 12/108,216

(22) Filed: Apr. 23, 2008

(65) Prior Publication Data

US 2009/0267594 A1 Oct. 29, 2009

(51) Int. Cl.
*G01B 7/30* (2006.01)
(52) U.S. Cl. .................... 324/207.25; 324/207.2
(58) Field of Classification Search ............. 324/207.25, 324/207.2, 207.21, 174
See application file for complete search history.

(56) References Cited

U.S. PATENT DOCUMENTS

| | | | |
|---|---|---|---|
| 6,278,271 B1 * | 8/2001 | Schott ........................ | 324/251 |
| 6,433,536 B1 | 8/2002 | Yundt et al. | |
| 6,720,763 B1 | 4/2004 | Nehl et al. | |
| 7,710,110 B2 * | 5/2010 | Patil et al. ................ | 324/207.25 |
| 2008/0054886 A1 * | 3/2008 | Uemura et al. ............ | 324/207.2 |

FOREIGN PATENT DOCUMENTS

| | | |
|---|---|---|
| DE | 19956361 | 6/2000 |
| EP | 1777501 | 4/2007 |

* cited by examiner

*Primary Examiner* — Jay Patidar
(74) *Attorney, Agent, or Firm* — Schlee IP International, P.C.; Alexander R. Schlee

(57) ABSTRACT

A position sensor, a position sensor arrangement and a method of operating the position sensor and position sensor arrangement is described, working on the basis of magnetic field sensing sensors maximizing reliability against defects and external interference signals and providing redundancy, in particular for shift-by-wire systems in automobiles. The invention includes various aspects and preferred embodiments including individual sensors that can either only measure the direction of the magnetic field or in addition to that the absolute value of the magnetic field. The specific embodiments depend on the desired diagnostic options, redundancy and compensation capabilities both as to interfering magnetic fields and sensor failures or non-plausible output signals of individual sensors. An evaluation unit can be provided for compensating measurement deviations. Goals are to make the position sensor compact in size, cost effective, maximize reliability against defects and external interference signals, have diagnostic ability and provide redundancy.

18 Claims, 2 Drawing Sheets

POSITION SENSOR, POSITION SENSOR ARRANGEMENT AND METHOD OF OPERATING THE SAME BY MEASURING THE ANGULAR ORIENTATION OF A LOCAL MAGNETIC FIELD VECTOR

BACKGROUND OF THE INVENTION

The present invention is in the field of position sensors and position sensor arrangements for contactless position sensing by means of redundant magnet-sensitive sensor elements.

Such an arrangement can in particular be used in connection with a "shift-by-wire" system for determining the command by the driver in case of an automatic transmission of a motor vehicle. The command by the driver determines the functional behavior of the transmission. Determining the command from the driver in connection with an automatic transmission comprises typically the following driving modi selection: parking, reverse driving, neutral and driving forward. Optionally driving forward is divided in two or more driving positions. Determining the command intended by the driver is crucial for proper operation of the vehicle and is therefore relevant as to safety. Therefore a safe determination has to be guaranteed and possible sensor errors have to be detected. In some applications further single error redundancy is required enabling limited emergency running properties.

Conventional prior art automatic transmissions comprise in addition to an electrical sensing of the driver command a mechanical connection to the hydraulic control of a automatic converter. The determination by means of a sensor and the electrical control plus the mechanical locking device represent a redundant system preventing the electronic sensor from determining, in the event of an error, the driving conditions. With such automatic transmissions the electronic sensor sensing the driver command is not to the same extent relevant as to safety.

However, in case of a "shifted-by-wire" system such a mechanical connection to the transmission is missing. The driver's command is sensed exclusively by means of electronic sensors and the appropriate actions by the transmission are conducted due to the information from the transmission selector switch (transmission range sensor) by means of electrical actuators in the transmission. An alternative form of the transmittal of this information that would allow locking in the case of an error does not exist in this case. Thus, the driver command sensing requires a very high reliability of the electronic sensor system.

In case of typical shift-by-wire-systems, the driver's command is transmitted at first mechanically by means of a push pull cable. The conveyed linear movement is converted by means of a lever into a rotational motion. The rotational motion includes a rest position corresponding with the appropriate drive positions. A position sensor arrangement is adapted to determine this angle of rotation. In particular, in the areas of the rest positions, a good detection is required.

Detection of the rotational angle by means of a sensor can be achieved in the various manners. In the automotive field, magnetic concepts dominate as robust systems that are cost efficient. Typically, these comprise pivoted magnetic transmitters interacting with a stationary sensor sensing the magnetic field. The transmitter is usually designed as a permanent magnet. For the actual sensing process, a characteristic component of the magnetic field is measured that is in a defined dependency on the parameter to be measured, namely the rotational angle. The advantage of this measuring method is that it does work contactless and therefore avoids problems due to contact corrosion or wear. A disadvantage is, however, that such sensors are generally sensitive to errors caused by external magnetic fields.

From the prior art systems are known where the transmitter comprises a homogeneous magnetic field and a sensor unit that transmits a signal dependent on the angle of the lines of the magnetic field. These systems can be made redundant by duplicating of the sensor unit. A disadvantage of such systems that provide only redundancy at the end of the sensor is the sensitivity against magnetic influences as, for instance, caused by electric current conductors since a change in the rotational angle of the magnetic field caused by undesired magnetic field interference cannot be distinguished from an actual change in the rotational angle of the transmitter. By means of a further magnetic transmitter having an orientation of its lines of the magnetic field preferably at about 90 degrees in relation to the first magnetic transmitter and that is coupled with the first magnetic transmitter is generally capable to distinguish an actual change in the rotational angle from a virtual change of the angle caused by any undesired magnetic interference. In order to fulfill the requirements as to reliability and to provide a single redundancy, this concept requires three sensor units and three transmitter units, i.e. magnets. This results in a non-acceptable size. A further disadvantage results from the fact that the additional measurement levels, due their distance from each other, are not subjected necessarily to the same interference vector, making a correction even more difficult.

From DE 199 56 361 C2, an angle of rotation sensor for sensing the angle of rotation in a homogeneous magnetic field is known. Although in connection with this sensor the arrangement of redundant magnet sensors is suggested, as a matter of principle it is impossible due to the homogeneous field to recognize interference fields under all possible conditions reliably and to minimize their influence.

SUMMARY OF THE INVENTION

With this background in mind, an object of the present invention is to create a position sensor and a position sensor arrangement on the basis of magnetic field sensing sensors that are compact in size and comprise only one magnetic sensing level, are cost effective, maximize reliability against defects and external interference signals, have diagnostic ability and, if necessary, provide redundancy, so that the high requirements for a shift-by-wire system are met.

The aforementioned and other objects are achieved by the position sensor and the position sensor arrangement according to the invention, in particular one that measure the direction of the magnetic flux in an inhomogeneous magnetic field and determines the angular position between a giver unit and a sensor unit based on the direction of the magnetic flux rather than relying solely on the absolute value of the magnetic field. Measuring the absolute value is a bonus that makes a diagnosis of sensor defects easier but is not the main criteria for determining the angular position between the giver unit and the sensor unit. Theoretically, the invention would work with only one pair of poles and only one sensor element that senses the direction of the magnetic flux in the inhomogeneous magnetic field and can be correlated to a specific angle between a giver unit and a sensor unit. However, for redundancy reasons and a higher stability against external interfering magnetic fields 2 or more sensor elements are preferred as described below.

Preferably, sensor elements or sensor cells can be used that measure the angle of the magnetic flux vector in all 3 Cartesian coordinates directions and calculate the direction in that sensor cell. In fact, 2 directions would be sufficient. As a bonus, also the absolute value of the magnetic flux can be determined.

Since the magnetic field is preferably inhomogeneous, a relatively small change in the angular position between the giver unit and the sensor unit results in a relatively significant change in the angular orientation of the magnetic flux that the respective sensor element and is therefore distinctive for the angular position between the giver unit and the sensor unit. This correlation can be trained into the system and stored in form or an electronic table in which each angular orientation of the measured electronic flux correlates for each sensor to a specific angular position between the giver unit and the sensor unit. In contrast, a less distinctive correlation would be determined if the absolute value of the magnetic flux is used for correlating it for each sensor to a specific angular position between the giver unit and the sensor unit.

Preferably, 3 sensor elements are provided since this provides also for an easy diagnosis in case one sensor fails and for additional redundancy. In addition, since the mean value of the angular orientation of the magnetic flux remains relatively constant, regardless whether or not a magnetic field interferes from the outside, calculating the mean value eliminates already most interfering magnetic fields unless these fields are extremely strong. For example, if an 80 degree angular position between the giver unit and the sensor unit is determined by all three sensor elements, then a magnetic field interferes, and the measured directions changes to 70 degrees for the first sensor element, remain at 80 degrees for the second sensor element, and changes to 90 degrees at the third sensor element, the average would still be 80 degrees. The result is that the interfering field changed measurements for the individual sensor elements, but did not affect the mean value. Using the mean value does therefore make the system less susceptible to magnetic interference fields.

In addition, an embodiment with 3 sensor elements allows for an easy diagnosis and easy calculation of a correction vector that can then be subtracted, reducing the measured directions of the magnetic flux to directions that were to be expected by the 2 sensor elements in combination.

Even though preferably 3 sensor elements are provided since this provides for an easy diagnosis in case one sensor fails and provides for additional redundancy, it is, however, also possible to embody the invention with only 2 sensor elements. In this case, redundancy is to some extent compromised since in case of failure of one sensor element the other one has to be believed. Also, the mean value is influenced stronger by an interfering magnetic field in case of only 2 sensors in comparison to a 3 sensor embodiment, making it more likely to require a mean value correction for the 2 sensor embodiment. At least in case of only 2 sensor elements, it is therefore useful to measure also the absolute value for a safer correlation between the measured magnetic flux directions and correlating angular position between the giver unit and the sensor unit, and to provide for more diagnostic options.

The invention includes various aspects and preferred embodiments, including depending on the desired diagnostic options, redundancy and compensation capabilities both as to interfering magnetic fields and failures or non-plausible output signals of individual sensors that individual sensors can either only measure the absolute value of the magnetic field, or the direction of the magnetic field, or both; and an evaluation unit can be provided that can compensate measurement deviations.

The position sensor according to the invention and the respective position sensor arrangement are suitable in particular for the determination of a rotational motion, although also linear movements can be determined. The sensor and the sensor arrangement are particularly adapted well for applications where the pivoting movement has to be determined with high reliability over a limited angular range. Typical fields of application are, beside the determination of a shift lever position in an automatic transmission, the determination of the pedal position in an electronic accelerator pedal or the position of an electronically operated brake pedal or of an electronically operated butterfly valve. The position sensor according to the invention is also suitable for applications where a continuous rotational movement is to be detected. In this case additional sensor elements might be necessary in order to guarantee the definiteness of the detected position signal since the position sensor, according to the present invention, is more geared to a specific angular range of a maximum of 180 degrees. The sensor according to invention is particularly suitable for the recognition of discrete switching positions, but as indicated, is also suitable for the recognition of continuous positions—e.g. for determining gas and brake pedal positions as mentioned above.

The position sensor according to the invention comprises a sensor unit and a giver unit. The sensor unit comprises at least two magnetic field-sensitive sensor elements. Simple Hall sensors measure typically only a scalar component of the magnetic flux density vector in a direction determined by the sensor positioning direction. In the context of the invention, preferably sensor elements are used that can determine the vector (i.e. the direction and the absolute value) of the magnetic lines of flux, although it is also possible to use scalar magnetic field sensors or sensors for measuring only the magnetic field direction angle. Particularly suitable are GMX or AMX sensors as well as 2-D and 3-D measuring Hall cells. Such multidimensionally measuring sensor elements can be arranged according to the invention as neighboring single sensors (e.g. two orthogonally arranged Hall cells for a 2-D-Hall sensor) and therefore be built from discrete elements.

Preferably, sensors are used according to the invention that are capable of preprocessing of the signals. Preprocessing refers both to the signal-technical adjustments and boosting and filtering as well as more complex computing algorithms.

The giver unit comprises at least an in part magnetized element that is mechanically coupled to the sensor unit, wherein the giver unit is preferably moved in a rotational manner in relation to the sensor unit that is preferably fixed (needless to say, it is also possible to move the sensor unit in relation to a fixed giver unit, but that is less preferable with regard to a connection to a signal line conducting the signals).

The embodiment adapted for rotational movement consists of a magnetized, preferably circular giver unit with N pairs of poles, whereby N equals or is higher than 2. Within the magnet ring an alternating magnetic field direction with strongly inhomogeneous lines of flux results. The vector of the lines of flux depends on the measuring point within the magnet ring, wherein the magnetic field direction along the inner circumference starting from one pole to the respective pole after next having the same polarity turns by in total 360 degrees. This turning of the magnetic field is typically non-linear in relation to the angle in circumferential direction, however, from the magnetic field direction within the aforementioned 360 deg. range a definite correlation between the magnetic field direction and the angular position exists. For this reason, the measuring range according to the present invention is in this embodiments 360 deg. divided by the number of pairs of poles.

Beyond this measuring range the signal of the magnetic field sensor elements is no longer definite and has to be supplemented by additional sensor signals.

According to an aspect of the present invention at least 2 sensor elements are provided (although a position sensor according to the invention could be realized in principle also with only one magnetic field sensor that is moved in an inhomogeneous magnetic field), wherein the desired redundancy is achieved wherein at the giver unit at least as many pairs of poles are present as sensor elements are present. The magnetic field sensors are arranged in such a manner that these are respectively positioned in the sphere of influence of the magnetic fields of the respective different poles of the giver unit.

The feature according to the invention providing that the sensor elements are arranged in the magnetic sphere of influence of different respective poles is in synergy with the feature according to the invention providing that the pole areas are arranged in a ring pattern or a ring segment pattern. Due to this arrangement, the lines of flux of a first pole, which are measured by a first sensor, are not parallel to the lines of flux of a second pole due to the curvature of the ring; in the following referred to as different nominal directions.

A magnetic interference field that comes from the remote location in comparison to the size of the position sensor is typically approximately homogeneous. Such an approximately homogeneous interference field affects, with different direction contributions, the magnetic field vectors measured by the individual sensor elements. Therefore, the displacement vector for the magnetic field vectors resulting from the magnetic interference field can be computed in a relatively simple way, so that a quantitative correction is possible which would not be so easily possible with parallel nominal vectors.

If in the context of the invention it is suggested that each sensor element is to be assigned to a particular pole, this does not exclude that also additional sensor elements can be provided that are arranged together with the particular sensor elements in the area of one particular pole.

Preferably, the number of pairs of poles corresponds to the number of sensor elements. For applications with particularly small measuring range various variations with more pairs of poles than sensors can be useful for a finer resolution over the measuring range that is 360 degrees/Number of pairs of poles. Apart from a symmetrical arrangement of the pairs of poles (i.e. the influence of north and south poles extends over the same angular range), in the alternative also asymmetrical pairs of poles can be provided, wherein in that case the useful measuring range is smaller than 360 degrees, namely 360 degrees divided by the number N of the pairs of poles. The definiteness is given by 360 deg./N, but with a smaller sensitivity in the boundary regions of the function.

The location of the sensors is chosen in such a manner that each sensor detects a different vector of the flux. Preferably, the location is chosen in such a manner that a maximum difference between the angles of the flux vectors results so that the best compensation for the interference fields is possible. The sensor elements determine one vector, respectively, that depends on the individual sensor position and the position of the giver unit. A change of angle of rotation of the giver unit causes a change of the field vector for all sensors. If the giver unit is rotationally symmetrically in relation to a rotation around an angle 360 deg./N and the sensor elements are also arranged in an angular distance of 360 deg./N with respect to each other along the circumference, a rotating motion results for each sensor element in approximately the same rotation of the respective flux vector. In this arrangement one sensor element is dedicated to each group of two adjacent poles.

For an arrangement of the sensor elements in that aforementioned matrix an equidistant distribution of the sensor elements along a full circle results (angular distance for example 120 degrees in case of 3 sensor elements and 3 pole pairs) if the number of pairs of poles coincides with the number of sensor elements. Since it is often desired to concentrate the sensor elements on as small a surface as possible in order to minimize the required surface on the electronic circuit board carrying the sensor elements and to simplify assembly, according to a preferred embodiment of the invention, the angular spacing can also be reduced to half, for instance 180 deg./N. Thereby it will be possible to concentrate the sensor elements on one half of the ring. With a rotationally symmetrical giver unit with identically formed north and south poles the aforementioned "half" steps result in that a phase shifted signal is a measure by one sensor in comparison to its neighboring sensor.

Each of the sensor elements comprises in general a given reference axis in reference to which the measurement of the magnetic field direction is conducted. For determining sensor errors reliably (e.g. the complete failure or degradation of one sensor for one axis direction), according to one preferred embodiment of the invention the angular orientation of the reference axis of at least one of the sensor elements distinguishes from the angular orientation of the reference axis of at least one other sensor element, wherein preferably all of the reference axes are differently oriented.

Alternatively or additionally, their angular position can be determined by the position where the respective sensor element is placed so that all sensors provide a different absolute value of the output signals over the entire given measuring range. In this preferred arrangement, all sensors provide different signals, all of which correlating to the same angle of rotation. In case of a change of the angle of rotation all sensor signals experience a change. The new signals can then be assigned again to the same new angle of rotation.

Since the sensor output signals generally change in a non-linear fashion over the measuring range with a change in the angular position between giver and sensor unit, it can be also preferred according to an alternative embodiment of the invention to arrange the sensors offset in relation to the aforementioned 180 degrees/N-positions, so that the change rate of the output signals of the sensor elements is different for each individual sensor element in comparison to the other individual sensor elements due to a particular relative rotation between giver and sensor unit. Due to a lower change rate of some individual sensors the precision of the angle determination can be improved.

The correlation of the particular sensor signals to a particular angle of rotation takes place via a position sensor arrangement with a position sensor according to the invention and an associated evaluation processing unit. The mathematical connection between angle position and sensor output signals is determined approximately by magnet geometry.

The system accuracy can be improved however in a preferred arrangement of the invention by learning certain points of reference. For the application of the sensor according to the invention as a shift lever arrangement the shift lever rest positions are preferably learned.

For an application of the position sensor with a system without rest points the learning for the sensor can be conducted by any number of points of reference. The calibration values are preferably stored in the sensor unit. For applications wherein the sensor is part of an intelligent programmable control unit, the calibration values are preferably stored in the control unit.

The detection of several magnetic field vectors of different nominal angles allows further the recognition and quantification of interferences.

For the correction of interferences at least two sensor elements are necessary. In a simple embodiment, the respective particular signals are correlated to a particular angle of rotation, respectively. If these angles of rotation differ by more than the permissible tolerance, either a magnetic field interferes or at least one sensor is defective. With this simple interference and error detection, upon recognizing an interference or error, reliable information is no longer possible.

A further option is to compute the interference vector. When knowing the interference vector it can be subtracted from the measured real magnetic field vectors. This allows determination of the non-shifted vectors that can then be correlated to a certain angle of rotation in each case. This correction allows distinguishing between an interference field and a defective sensor: If an interference field is present, then the corrected vectors all correlate to the same angle of rotation. In case of a defective cell the vector lies also after the correction further outside of the permissible range of tolerance. Those sensor elements that sensed prior to the correction a comparable angle of rotation, are intact; the deviating cell is defective.

A further diagnostic option is for each sensor element to learn the magnetic flux density, i.e. the particular measured absolute value of the magnetic field vector correlating to a particular magnetic field angle for each sensor element. Since for determining the angle of rotation according to the invention the magnetic field direction is already sufficient, the local magnetic flux density determined by the sensor elements represents additional information that can be processed for conducting a plausibility check. Under consideration of the tolerances a bandwidth is stored. If the measured flux density for a certain measured magnetic field angle deviates from that bandwidth, then an interference or error are present. Preferably, this function is stored centrally or in a decentralized fashion in the sensor unit and the system is trained when the sensor unit is matched with the giver unit. Such trained sensor units allow correction even in an arrangement comprising only two sensors in that the non-plausible signal from one of the sensors is discarded.

Systems with even additional redundancy can be developed by adding only one further sensor element (a duplicating of both sensor elements is not necessary). In case of three sensor elements these are preferably arranged at an angular distance of 120 deg. to each other on the sensor radius. In this case, also if one of the sensors fails a correction is possible. Due to the arrangement in 120 deg.—matrix and the resulting smaller measuring range a higher accuracy of the sensors is achieved. One possibility of being able to do without a higher precision requirement is to include the information of the trained nominal direction (flux density over angular orientation). In the event of an error the deviation of the signals of the functional sensors from the trained nominal direction is substantial information for the correction.

If the integrated signal processing circuit of a sensor element already implemented a diagnostic possibility, an appropriate diagnostic signal can of course be considered.

An alternative error recognition for the sensor elements can be conducted by a frozen signals analysis during angle change. In this case, the classic two out of three evaluation can be conducted. If a first signal changes and two further signals remain constant, this indicates that the changing signal should be disregarded in the future. If two signals change and one remains constant, the constant signal is to be regarded as defective.

The basic concept described in connection with an angle of rotation sensor can likewise be applied to a linear embodiment. In this embodiment the magnet geometry is such that a change of the angle of rotation occurs in the process of a linear position change, wherein the magnetic giver carries out a linear movement. The geometry of the magnet is such that along the direction of motion an angular change of the direction of the lines of flux results. In this embodiment, the sensor units are arranged in analogy to the rotational movement embodiments in such a manner that each sensor detects a different angle.

For other sensitive applications, like e.g. an electronic accelerator pedal (E-gas) or a butterfly valve sensor with a measuring range of equal to or smaller than 90 deg., according to a preferred embodiment of the invention four pairs of poles and two sensor elements are provided, if the redundancy requirements do not require in case of an error more sensor elements. With two sensor elements in an arrangement with lines of flux that are perpendicular to each other an interference field detection as well as a sensor error detection are possible. An optimization by a learning process for the flux density in relation to the angle can be used as well in order to increase the reliability even further. In the case of a sensor error an emergency running mode with a reduced engine torque can be implemented for ensuring safety.

BRIEF DESCRIPTION OF THE DRAWINGS

The invention is in the following described in more detail by referring to the drawings. In the drawings show.

DETAILED DESCRIPTION OF THE DRAWINGS

Figure 1A:
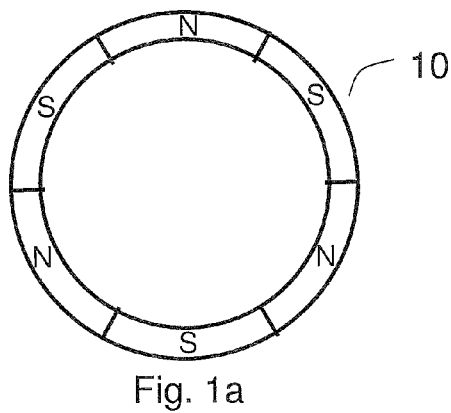
FIGS. 1a-e: various schematic views of a position sensor according to the invention comprising three sensor elements.

FIG. 1a shows a circular magnetic transmitter unit 10 with symmetrically arranged, equally large magnetic north and south poles, each arranged at the 60 degree angle. Even though the magnetic transmitter unit 10 in FIG. 1a is shown as a completely magnetized closed ring, it could in the alternative be formed as a planar structure made of magnetizable material and comprise magnetized circular areas (not shown).

Figure 1B:
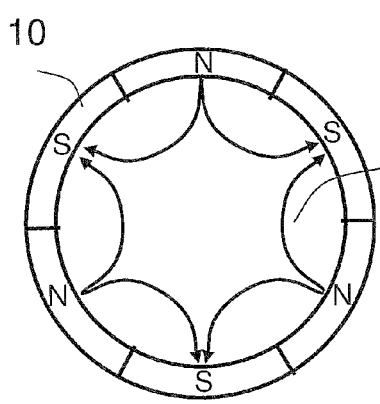
Figure 1C:
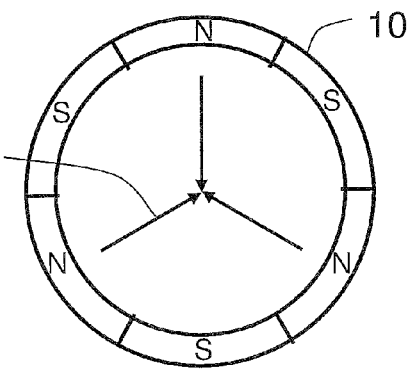

In FIG. 1b the orientation of the lines of the magnetic field 12a is shown that emanate from the three magnetic south poles of the ring magnet 10; in FIG. 1c the corresponding orientation of the lines of the magnetic field 12b emanating from the north poles is shown. As it becomes apparent that the magnetic fields are strongly inhomogeneous wherein in the proximity of the interior area of the ring magnet 10 the orientation of the lines of the magnetic field change over an angle range of 120 degrees (i.e. over two poles) for 360 degrees in each case.

Figure 1D:
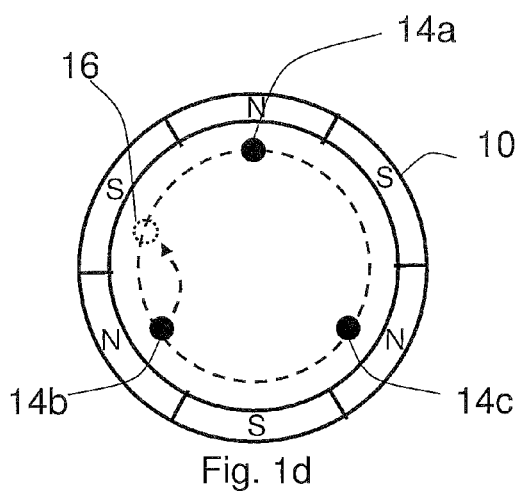
Figure 1E:
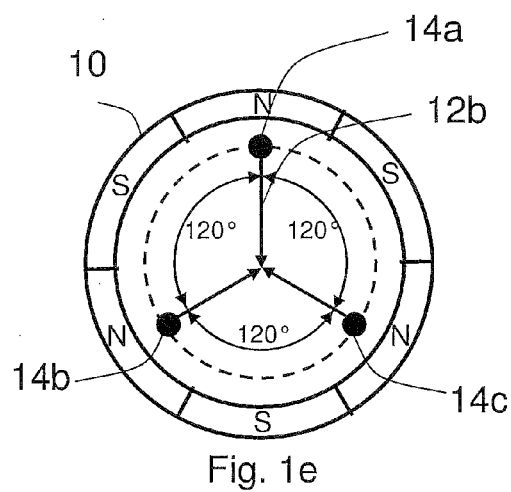

This orientation of the lines of the magnetic fields is preferably detected by means of a sensor arrangement as it is schematically shown in FIG. 1d. For this purpose, the sensor elements 14a,b,c are arranged on a circle centrically to the rotation axis (that runs through the center of the ring magnet perpendicularly to the plane in which the ring magnet extends in the drawings). The angle between the sensor elements 14a,b,c are preferably divided into equally large sections of 120 degrees, see also FIG. 1e. During a relative motion between transmitter and the sensor unit the angle of rotation of the magnetic flux vectors is for a factor three higher than the angle of rotation of the magnetic transmitter.

In an alternative embodiment also an accommodation of all sensor elements within an angle range of 180 deg. with symmetrical magnetic transmitters is possible. For this purpose the sensors can also be shifted in 60 deg.—steps, as shown in FIG. 1d by the example of the sensor element 16 (in lieu of the sensor element 14b), whereby the appropriate sensor then detects accordingly a pattern of the lines of the magnetic field.

Figure 2:
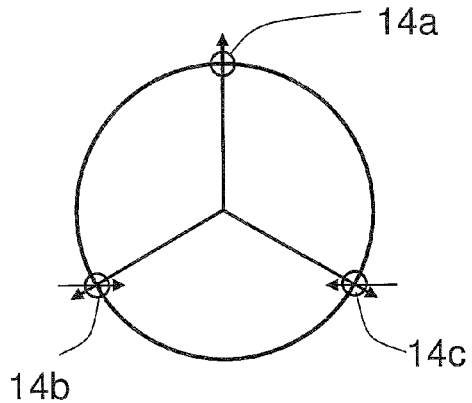
FIG. 2: a view demonstrating an example of the orientation of the reference axis of the individual sensor elements.

If the sensors are arranged relative to the nominal vector in the same angular orientation, the angle of the lines of the magnetic field is the same for all sensor elements. In a preferred embodiment as shown in FIG. 2, the orientation of the sensors 14a,b,c relative to the respective nominal vector, is selected differently so that systematic errors of the sensor elements are detected more reliably.

Figure 3A:
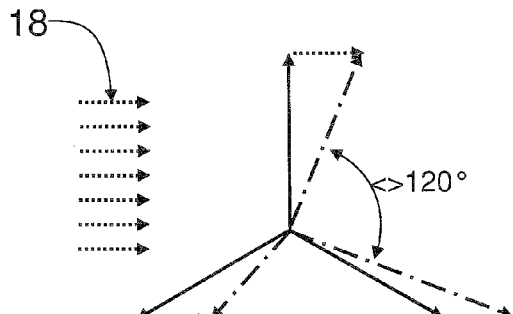
FIGS. 3a-c: views demonstrating the correction process according to the invention.

In the FIGS. 3a-c the influence of an external homogeneous interfering field that interferes with the measuring signals is described in more detail in connection with a position sensor arrangement with three sensor elements. In accordance with FIG. 3a an interfering homogeneous field 18 has the effect that the nominal vectors all experience a different angle change. Further it is to be recognized that the scale value of the vectors deviates in relation to the nominal value. Also the vectors no longer have the same length. Both indications can be used for recognizing interference.

Figure 3B:
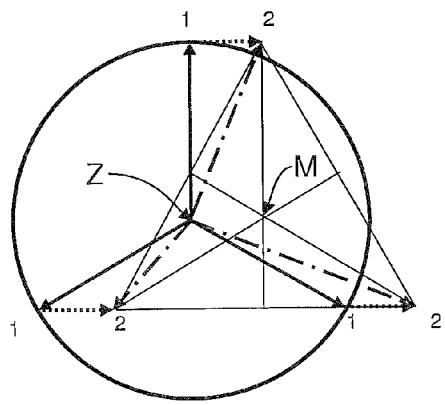
Figure 3C:
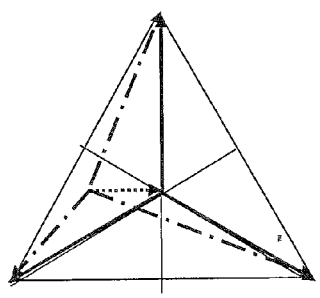

In FIGS. 3b and 3c the vector correction procedure is described in more detail: In FIG. 3b the three nominal vectors 1 are shown, extending from the center Z of the circle to the outside radius. The vectors with an interfering interference 2 define a triangle. The shift of the center M of the triangle to the center Z of the circle corresponds to the interfering vector. For the purpose of correction the interfering vector can be subtracted or a new substitute vector can be calculated. In FIG. 3c the corrected vectors are shown, which are defined as extending from the end point of the distorted vectors to the new center.

Figure 4A:
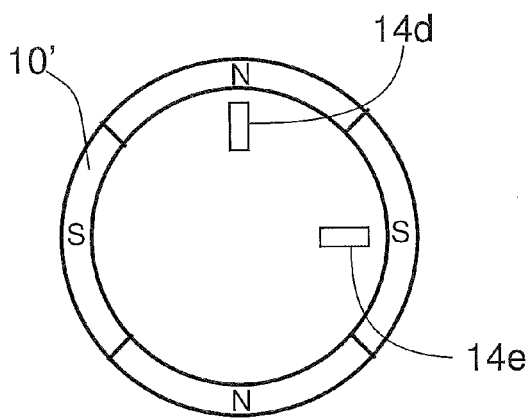
FIG. 4a,b: schematic views of two further embodiments of the position sensor according to invention.
Figure 4B:
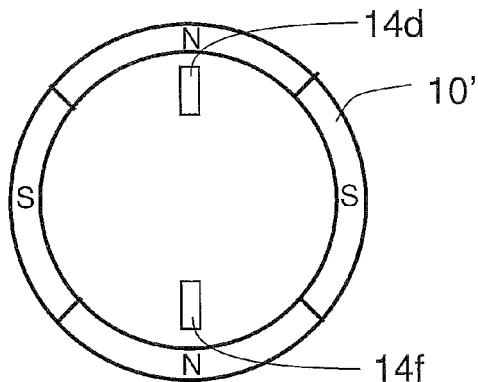

A further preferred embodiment for applying an interference compensation but providing lower redundancy is shown in FIGS. 4a and 4b, comprising each one transmitter unit 10' with two pairs of poles. In the arrangement in accordance with FIG. 4a the lines of the magnetic field are spaced apart by a 90 deg. angle arranged perpendicular to each other for the two sensor elements 14d, 14e. In the arrangement in accordance with FIG. 4b the sensor elements 14d, 14f are spaced apart by a 180 degree angle and the lines of the magnetic field extend in opposite directions against each other. In both embodiments a rotational motion causes a change of signal that can be correlated for both sensors 14d,14e; 14d,14f in both embodiments 4a; 4b to particular angles of rotation. Interfering magnetic fields cause a change in the signal that correlates to different rotational angles in both sensors.

The invention claimed is:

1. Position sensor for a contactless determination of a position by means of redundant magnet-sensitive sensor elements, comprising:

a giver unit and a sensor unit that is movable in relation to the giver unit within a predetermined position determination range, wherein the giver unit comprises permanent magnet areas disposed in a ring or ring segment pattern and comprises an alternating pole sequence in the direction of the relative movement, so that for the sensor unit an inhomogeneous, alternating magnetic field results, the sensor unit comprises at least two magnet-sensitive sensor elements that generate one or more electrical output signals that are at least dependent on the respective local magnetic field direction, and that are disposed at different positions adjacent to the surface of the giver unit, wherein the predetermined position determination range and the pole sequence of the giver unit are to interact such that each sensor element during a relative motion between giver and sensor unit over the entire given determination range senses a change of the magnetic field direction of maximally 360 deg., so that each sensor element over the given position determination range generates an output signal that is definite for each particular relative position between giver and sensor unit, and at least two pairs of poles on the giver unit and at least two sensor elements are provided, wherein each sensor element is arranged in the magnetic sphere of influence of another pole of the giver unit, wherein at least one of the sensor elements is a multidimensionally measuring sensor element that measures an angular orientation of the magnetic field in at least 2 dimensions for determining the direction of a respective local magnetic field vector; and the sensors are connectable to a data processing unit for computing an interference vector and determining corrected vectors by subtracting that interference vector from measured real magnetic field vectors.

2. The position sensor according to claim 1, wherein all of the sensor elements are multidimensionally measuring sensor elements that measure the angular orientation of the magnetic field in at least 2 dimensions for determining the direction of the respective local magnetic field vector.

3. The position sensor according to claim 1, wherein the position sensor is to measures an angle of the rotation, wherein the giver unit is designed as a ring magnet with a number of pairs of poles N of at least two, and wherein the predetermined position determination range is an angle of 360/N degrees or less.

4. The position sensor according to claim 3, wherein the magnetic field of the giver unit is rotationally symmetrically with regard to a rotation around an angle of 360/N degrees, and that the sensor elements are arranged at such respective angular positions along the inner or outer circumference of the ring magnet that these are offset with respect to each other by an angle of approximately 360/N degrees or of approximately 180/N degrees, wherein in the latter case all sensor elements are positioned within an angular range of in total 180 degrees.

5. The position sensor according to claim 1, wherein each of the sensor elements comprises a predetermined axis of reference in relation to which the magnetic field direction is measured, wherein the angular orientation of the reference axis of at least one sensor element deviates from the angular orientation of the reference axis of at least another sensor element, wherein all reference axes differ in orientation and the reference axes of all sensor elements are oriented such that over the entire given measuring range each sensor generates a different absolute value of the output signals distinguishing from all other sensors.

6. The position sensor according to claim 1, wherein at least one of the sensor elements is to measure the absolute value as well as the angular orientation of the respective local magnetic field vector.

7. The position sensor according to claim 1, wherein all of the sensor elements are to measure the absolute value as well as the angular orientation of the respective local magnetic field vector.

8. Position sensor arrangement with a position sensor according to claim 1 and an evaluating processor unit connected to the position sensor, wherein the evaluating processor unit is to compute the relative position between sensor unit and giver unit from the sensor output signals and to determine a plausibility signal for the sensor output signals and correct an output signal from one sensor element that is determined as incorrect on the basis of the output signals of the remaining sensor elements.

9. The position sensor arrangement according to claim 6, further comprising an evaluation unit that is to compute from the output signals of the individual sensor elements respective sensor-specific relative positions based on a stored functional interrelation, to compare the relative positions derived from the individual sensor elements, and in case of deviations exceeding a given threshold value, mark the respective relative position as non-plausible.

10. The position sensor arrangement according to claim 6, further comprising sensor elements that are completely or partly to measure the absolute value as well as the angular orientation of the respective local magnetic field vector; and an evaluation unit that is to compute on the basis of the magnetic field vectors measured by the individual sensor elements a computed geometrical center, to compute a difference vector between the computed geometrical center and the position of an actual center of the sensor arrangement, and to correct the respective individual magnetic field vectors by means of this difference vector.

11. The position sensor arrangement according to claim 6, further comprising an evaluation unit is connected to a read-only-memory and is to store during a learning phase for each of the sensor elements the respective absolute value of the magnet field vector and the related magnetic field orientation for one or several predetermined relative positions as a data set belonging together, and during the actual operation determine from the measured magnetic field direction for the individual sensor elements an estimated absolute value of the magnetic field vector, and in case of a deviation between the estimated value and measured value exceeding a threshold value, to discard the measured value of the respective sensor output value as non-plausible.

12. The position sensor arrangement according to claim 6, wherein the position sensor comprises three sensor elements, wherein in case the relative positions determined from the output signals of two sensor elements coincide within a predetermined measuring tolerance and the output signal of the third sensor element appears non-plausible, the output signal from the third sensor element is not considered for determination of the relative position.

13. A method for a contactless determination of a position by means of redundant magnet-sensitive sensor elements, comprising the steps of:
providing and fixing a giver unit comprising permanent magnet areas disposed in a ring or ring segment pattern and comprises an alternating pole sequence in a direction of relative movement, so that for the sensor unit an inhomogeneous, alternating magnetic field results,
providing and moving a sensor unit having at least 2 sensor elements in the direction of relative movement in relation to the giver unit along a predetermined rotational movement path within a predetermined position determination range of less than 360 degrees,
measuring an angular orientation of the magnetic field in at least 2 dimensions for determining the direction of respective local magnetic field vectors by at least one of the 2 sensor elements,
correlating the angular orientation of the local magnetic field vectors to the relative movement position between the giver unit and the sensor unit; and computing an interference vector and determining corrected vectors by subtracting that interference vector from measured real magnetic field vectors.

14. The method for a contactless determination of a position by means of redundant magnet-sensitive sensor elements according to claim 13, wherein the correlating step is performed by obtaining the relative movement position between the giver unit and the sensor unit from a value gathered from a prestored table that was obtained by training through measuring an number of relative movement position externally and sensing the 2 correlating local magnetic field vectors orientations for the respective relative movement position.

15. The method for a contactless determination of a position by means of redundant magnet-sensitive sensor elements according to claim 13, comprising the step of additionally measuring the absolute value of the respective local magnetic field vector.

16. The method for a contactless determination of a position by means of redundant magnet-sensitive sensor elements according to claim 13, comprising the steps of calculating a mean angle from the correlated angle for the relative movement position between the giver unit and the sensor unit.

17. The method for a contactless determination of a position by means of redundant magnet-sensitive sensor elements according to claim 13, comprising the steps of determining whether the corrected vectors all correlate to the same angle of rotation and in the affirmative determine that all sensor elements are working properly.

18. The method for a contactless determination of a position by means of redundant magnet-sensitive sensor elements according to claim 13, comprising the steps of providing at least 3 sensor elements and determining whether the corrected vectors all correlate to the same angle of rotation, wherein in case one corrected vector for one particular sensor element is still outside a permissible range of tolerance, correlating the uncorrected measured real magnetic field vectors of all sensor elements with an angle of rotation, and determine a particular sensor element as defective that has a deviating correlating angle of rotation deviating from the correlating angles of rotation for the other sensor elements.

* * * * *